US006771357B1

(12) United States Patent
Inukai

(10) Patent No.: US 6,771,357 B1
(45) Date of Patent: Aug. 3, 2004

(54) FALSE NOTE DETECTING DEVICE AND AN ELECTRIC BULB FOR USE IN DETECTING A FALSE NOTE

(75) Inventor: Yoshihisa Inukai, Matsumoto (JP)

(73) Assignee: SEL, Inc., Matsumoto (JP)

( * ) Notice: Subject to any disclaimer, the term of this patent is extended or adjusted under 35 U.S.C. 154(b) by 0 days.

(21) Appl. No.: 09/531,209

(22) Filed: Mar. 20, 2000

(51) Int. Cl.[7] .................................................. G06K 9/74
(52) U.S. Cl. ........................................................ 356/71
(58) Field of Search ............................ 356/71; 283/72; 382/112, 134, 135; 250/556

(56) References Cited

U.S. PATENT DOCUMENTS 3,618,765 A * 11/1971 Cooper et al. .............. 209/534
4,296,326 A * 10/1981 Haslop et al. ................ 283/70
4,618,257 A * 10/1986 Bayne et al. ................. 356/71
5,574,790 A * 11/1996 Liang et al. .................. 283/89
5,918,960 A * 7/1999 Hopwood et al. ............ 356/71
6,269,169 B1 * 7/2001 Funk et al. ................... 356/71

* cited by examiner

*Primary Examiner*—Zandra V. Smith
(74) *Attorney, Agent, or Firm*—Osha & May L.L.P.

(57) ABSTRACT

The false note detecting device 1 has a case 2 in which there are provided an ultraviolet irradiating LED 3, a light receiving element 5, an on-off switch 9, and a signal processing circuit 6 for determining an ultraviolet pattern of a note to be inspected based on an output of the light receiving element 5 to judge whether the note is true or false. By scanning the surface of the note to be inspected in hand operation, it is possible to judge the note's truth or false easily.

6 Claims, 4 Drawing Sheets

FALSE NOTE DETECTING DEVICE AND AN ELECTRIC BULB FOR USE IN DETECTING A FALSE NOTE

BACKGROUND OF THE INVENTION

1. Field of the Invention

The present invention relates to a false note detecting apparatus conducting a judge based on an ultraviolet rays irradiation pattern printed on notes. The present invention also relates to an electric bulb for use in detecting a false note for giving availability in using a flashlight as a portable false note detecting device.

2. Related Art Description

There are notes which has an ultraviolet irradiation pattern on their surfaces with ultraviolet reaction ink in order to detect false notes.

Conventionally, a false note detecting device of the desk-top type and the like is provided inside with an ultraviolet irradiation lamp, which irradiates an ultraviolet light on notes sent from a note-insertion and reads its design to judge the note's truth or false based on a result of the reading.

Taking into the consideration of the present circumstance where the foreign notes are circulated with the liberalization of finance, it is convenient to detect the false notes at general retail shops. It is also convenient to detect the truth or false when pedestrian exchange notes in a city.

However, conventionally, ideas that fulfill above demands have not yet been proposed.

One of the purposes of the present invention is to propose a small and light false note detecting device.

Another purpose of the present invention is to propose a false note detecting device to be able to read an ultraviolet irradiation pattern in line.

SUMMARY OF THE INVENTION

A false note detecting device according to the present invention comprises an LED that emits an ultraviolet light, an ultraviolet transmitting filter positioned at an irradiation side of the LED, a case in which the LED is accommodated and an ultraviolet irradiation opening formed in the case.

It is desirable to cover the ultraviolet irradiation opening by an ultraviolet transmitting protection plate for preventing dusts from invading into the case.

Also, for portable use, it is desirable that the false note detecting device according to the present invention comprises a power supply installed inside the case and an on-off switch for controlling power supply to the LED. Adopting this, it will no longer be necessary to supply power from the commercial power supply with using a voltage transformer or the like, consequently, it becomes possible to check notes wherever you want Further, to conduct a judgement of note's truth or false automatically, the false note detecting device according to the present invention comprises a light receiving element that detects an ultraviolet reflected light which was reflected on a predetermined point after irradiated outside, a signal processing circuit that conducts a judgement of the truth or false of the notes to be inspected based on an output signal of the light receiving element and an alarm means for informing the results of the note's truth or false obtained by the signal processing circuit. The alarm means may be a liquid crystal display device, a buzzer or the like.

To judge the truth or false of the notes accurately, it is desirable to detect not only the ultraviolet irradiation pattern but also a magnetic pattern vested on notes. For doing this, a false note detecting device according to the present invention is equipped with a permanent magnet and a magnetic sensor, wherein the signal processing circuit conducts a judgement whether the note to be inspected is false or not based on an output signal of the magnetic sensor.

For scanning the note's surface by manually moving the false note detecting device case, it is necessary to keep a prescribed space between the light receiving element and the surface of the note. For this, the case may be formed on its surface with a guiding projection to scan the surface of the note by the ultraviolet light with maintaining the prescribed space with respect to the light receiving element.

Next, the present invention is directed to a false note detecting sensor block which is suitable for assembling into a false note detecting device which reads an ultraviolet irradiation pattern on a surface of a note in line and judges whether the concerned note is true or false. The false note detecting sensor block comprises an LED array that has a plurality of ultraviolet irradiating LEDs arranged in a row, a collimating lens for making the irradiated light from the LED array to be a collimating one and for irradiating the collimating light on a surface of a note to be inspected, an ultraviolet transmitting filter arranged between the LED array and the collimating lens, a condenser lens for converging an ultraviolet reflected light reflected on the surface of the note to be inspected, and an inline image sensor for detecting the ultraviolet reflected light received through the condenser lens.

The sensor block is further provided with a signal processing circuit which, based on the inline image sensor's output signal, determines the ultraviolet irradiation pattern printed on the surface of the note with ultraviolet reaction ink, and thereby judges truth or false of the note to be inspected.

Next, the present invention is directed to a false note detecting device equipped with the false note detecting sensor block of the above constitution. The false note detecting device comprises a note transfer mechanism for transferring the note to be inspected along a transfer path which passes through a detecting area by the false note detecting sensor block.

In this case, the note transfer mechanism is provided with first and second note discharge paths and a distribution mechanism for distributing notes to the first and second discharge paths based on the result of inspection by the false note detecting sensor block, whereby true and false notes can be retrieved separately.

On the other hand, the inventor of the present invention paid attention to the flashlight, and conceived an idea to detect the false note by using the flashlight as it is, by means of installing a false note detecting bulb substituting for the flashlight bulb. Namely, a false note detecting bulb according to the present invention is characterized in that it is exchangeable for the flashlight bulb and irradiates an ultraviolet light.

A typical false note detecting bulb has an irradiating tube, a screwed base installed on the irradiating tube, an LED for irradiating an ultraviolet light enclosed inside the irradiating tube, and an ultraviolet transmitting filter which is installed inside of the irradiating tube.

Where the false note detecting bulb of the present invention is installed in exchange for the marketed flash light bulb, the flashlight concerned becomes a flashlight note detecting device for irradiating an ultraviolet light. In other words, irradiating the ultraviolet light to the notes, a design formed on the note's surface will come out, and then it becomes visible. Confirming this design, it is possible to judge the note's truth or false.

Accordingly, using the false note detecting bulb of the present invention, it is possible to judge the truth or false notes wherever and whenever you want. So it is more convenient than the conventional false note detecting method that should have used the installed false note detecting device in a fixed place or specific place.

DETAILED DESCRIPTION OF PREFERRED EMBODIMENT

In the following, examples of the false note detecting device according to the present invention will be explained with reference to the attached drawings.

(First example)

Figure 1:
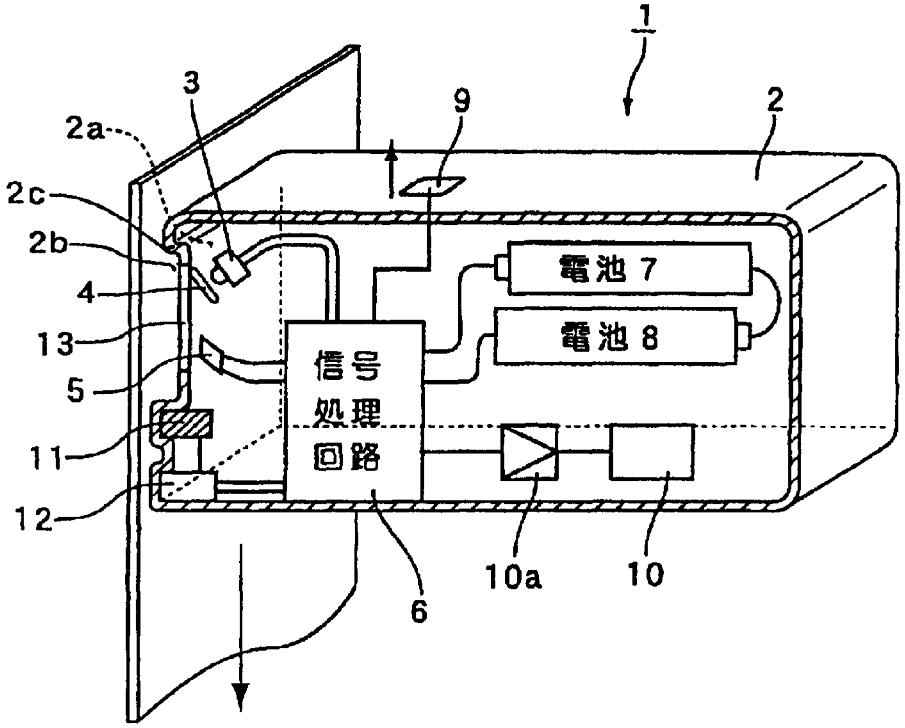
FIG. 1 is a schematic diagram of a first example of a false note detecting device according to the present invention.
Figure 2:
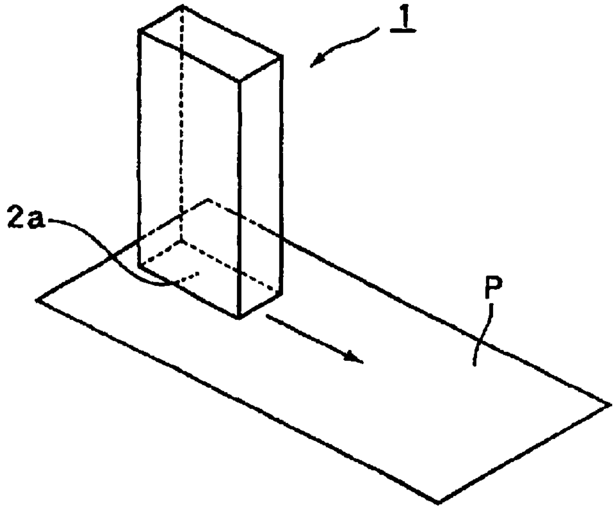
FIG. 2 is an explanatory view illustrating the status of conducting reading a note by using the device of FIG.1.

FIGS.1 and 2 show an example of a small and light portable false note detecting device suitable for carrying. The false note detecting device 1 has a cube shaped case 2 in which there are provided an ultraviolet irradiation LED 3, an ultraviolet transmitting filter 4 positioned on the irradiation side of the LED 3, a semiconductor light receiving element 5 for receiving a reflected light, a signal processing circuit 6, 7 and 8 as a power supply, a switch 9 and a buzzer 10. Further, a permanent magnetic 11 and a magnetic sensor 12 are also provided.

In the front end surface 2*a* of the case 2, there is formed an ultraviolet irradiation opening 2*b* which is covered by an ultraviolet transmitting protection plate 13.

Here, on an edge of the front end surface 2*a* of the case 2, there is formed a guiding projection 2*c*. At the backward position of this guiding projection 2*c*, is positioned the opening 2*b*. At the backside of the protection plate 13, the LED 3 and the light receiving element 5 are positioned. The permanent magnet 11 and the magnetic sensor 13 are arranged in this order at the rear side portion of the case front end surface 2*a* adjacent to the opening 2*b*.

When the switch 9 is turned on, the power is supplied from the butteries 7 and 8 to the signal processing circuit 6, the LED 3 and the magnetic sensor 12. While this condition is maintained, with case 2 in hand, slide the surface of a note P to be inspected along its long side direction as shown in FIG.2. As a result, a reflected light of the ultraviolet light, which irradiates the note's surface from the LED 3 via the filter 4 and the protecting plate 13, is detected by the light receiving element 5.

The note P is formed on its surface with ultraviolet irradiation pattern printed by ultraviolet reaction ink, this pattern is read and based on this reading pattern, the signal processing circuit 6 conducts a judgement whether the note is true or false. When judged to be a false note, the warning buzzer is to beep through the driver 10*a*, so that it is informed that the inspected note is a false one.

Simultaneously, the magnetic pattern formed on the note to be inspected is also read by the magnetic sensor 12, and the signal processing circuit 6, based on the magnetic pattern, conducts a judgement of the note. Where the note is judged to be a false one based on the magnetic pattern, the warning buzzer is also generated. Accordingly, only when both the ultraviolet irradiation pattern and the magnetic pattern are judged as the truth one, the note to be inspected is judged to be true and the warning buzzer is not generated.

(Modification of the First Example)

In the false note detecting device 1 as shown above, it is possible to omit, for example, the permanent magnet 11, the magnetic sensor 12, the signal management circuit 6 and the buzzer 10. In this case, the judgement of the note is carried out artificially by confirming visible pattern that comes out by irradiating ultraviolet light to the pattern on the note's surface.

(Second Example)

Next, an example of the false note detecting device will be explained which is able to read the ultraviolet irradiation pattern formed on the surface of the note in line.

Figure 3:
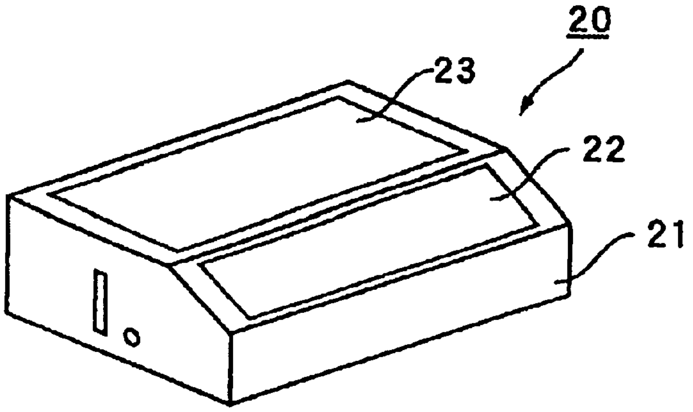
FIG. 3 is an outer perspective view of a false note detecting sensor block for reading the ultraviolet irradiation pattern on the surface of the note in line.
Figure 4:
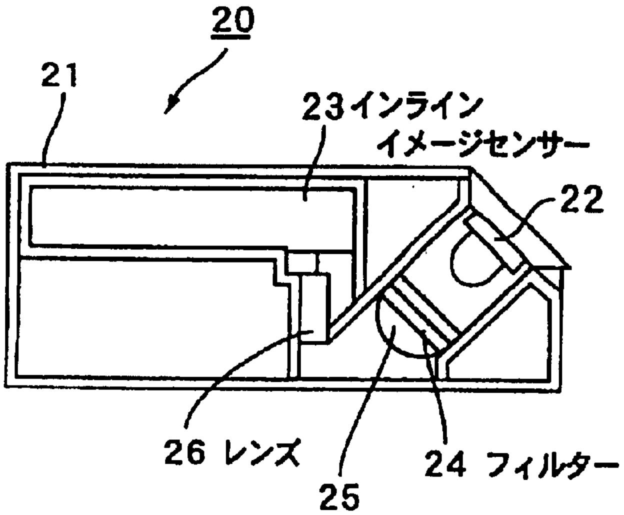
FIG. 4 is a schematic diagram showing the inside structure of the sensor block of the FIG. 3.

First of all, in FIGS. 3 and 4, there is shown a false note detecting sensor block for reading the ultraviolet irradiation pattern in line. As shown in these drawings, the false note detecting irradiation sensor block 20 has a case 21 in which there are provided an LED array 22 composed of a plurality of ultraviolet irradiation LEDs arranged in a row and an inline image sensor 23 arranged parallel to the LED array 22. At the irradiation side of the LED array 22, the ultraviolet transmitting filter 24 is arranged, at the irradiation side of which the collimating lens 25 is installed.

The ultraviolet light, which is irradiated via the lens 25 and reflected on the surface of the note to be inspected, is to converge on the light receiving surface of the inline image sensor 23 via a condenser lens 26.

Figure 5:
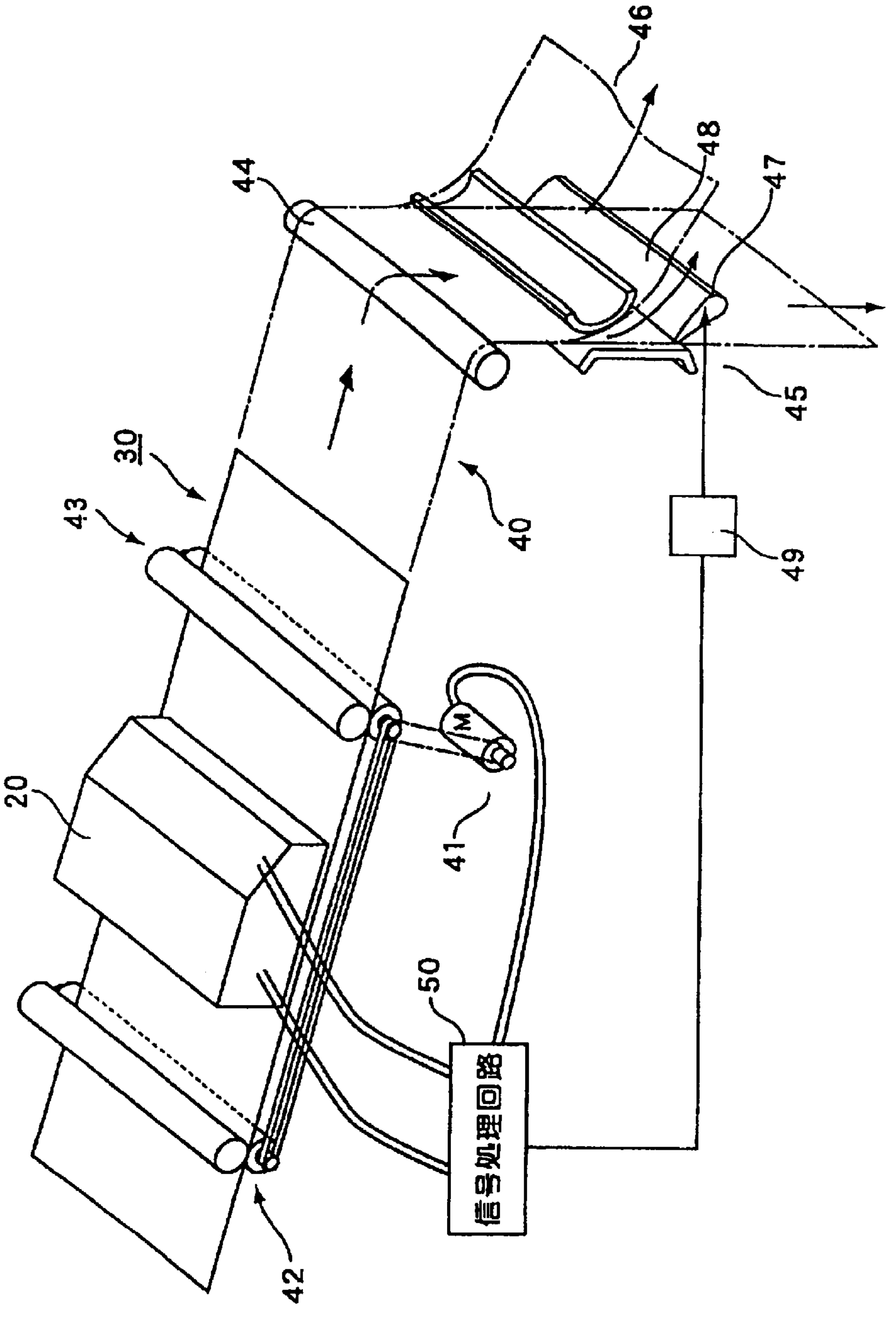
FIG. 5 is a system diagram of a false note detecting device in which the sensor block of FIG. 3 is assembled.

FIG. 5 illustrates the system construction of a false note detecting device provided with the false note detecting sensor block 20 having the above constitution.

The false note detecting device 30 of this example has a transfer mechanism 40 which transfers the note P to be inspected through an inspection area of the sensor block 20. It also has a signal processing circuit 50 which controls the LED array 22 and detects the light pattern printed on the note based on an output signal of the inline image sensor 23.

The transfer mechanism 40 can adopt the generally known mechanism, and is constituted by a motor 41, a pair of transfer rollers 42 and 43, a transfer guide (not shown) for defining a transfer path, a guide roller 44 and the like. Further, the transfer mechanism 40 has a transfer path separated into a first discharge path 45 and a second discharge path 46, and a distribution mechanism 47 for distributing the note after checked by the false note sensor block 20 into the first or second discharge path 45 or 46 based on the inspection result. The distribution mechanism 47 has a guide plate 48 for shifting transfer passages, a drive means such as an electric magnet solenoid (not shown) for driving the guide plate 48, and a drive circuit 49 controlling to drive the guide plate 48 in accordance with a signal from the signal processing circuit 50 representing the inspection result.

Since the thus constituted false note detecting device 30 is provided with the signal processing circuit 50 for judging the ultraviolet irradiation pattern on the surface of the note two dimensionally, it is possible to judge by reading the ultraviolet irradiation pattern on the surface of the note two dimensionally, whereby conducting a judgement on the authenticity of the note more accurately.

Also, based on the inspection result, the guide plate 47 is shifted to distribute the truth and false notes automatically and to discharge the notes to discharge trays (not shown) at the rear stage.

(Third Example)

Figure 6:
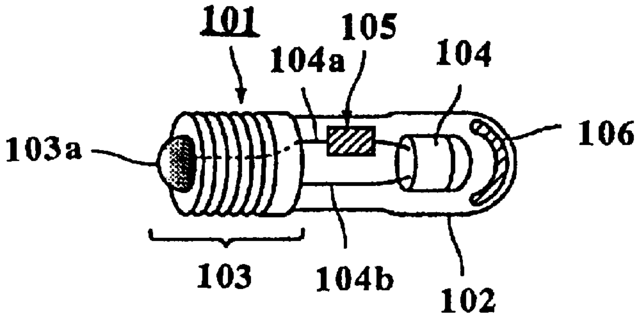
FIG. 6 is an explanatory view showing an example of a false notes detecting bulb according to the present invention.

FIG. 6 illustrates a typical example of a false note detecting bulb according to the present invention. As shown in this figure, a false note detecting bulb 101 has a cylindrical enlighten tube 102 whose one end is hemispherically sealed, a screwed type metal base 103 attached on the other end of the tube 102, and the hemispherical contact part 103*a* formed on the center of the metal base 103. The enlighten tube 102 is made of glass or plastic, and an ultraviolet enlighten LED 104 (wavelength is about 360 nm) is sealed inside the tube 102. The LED 104 has two leads 104*a* and 104*b* are connected to the contact part 103*a* and metal base 103, respectively. A constant current circuit 105 is inserted into the lead 104*a*. Further, the ultraviolet transmitting filter 106 is put inside of the hemispherical inner topside of the enlighten tube 102.

Here, the thus constituted false note detecting bulb 101 is the same standard as the marketed portable flashlight, which makes it possible to install it as a substitute for the bulb of the portable flashlight In this example of the false note detecting bulb 101, although the constant current circuit 105 is arranged separately from the LED 104, it is needless to say that the LED 104 can be assembled into the constant current circuit integrally.

Figure 7:
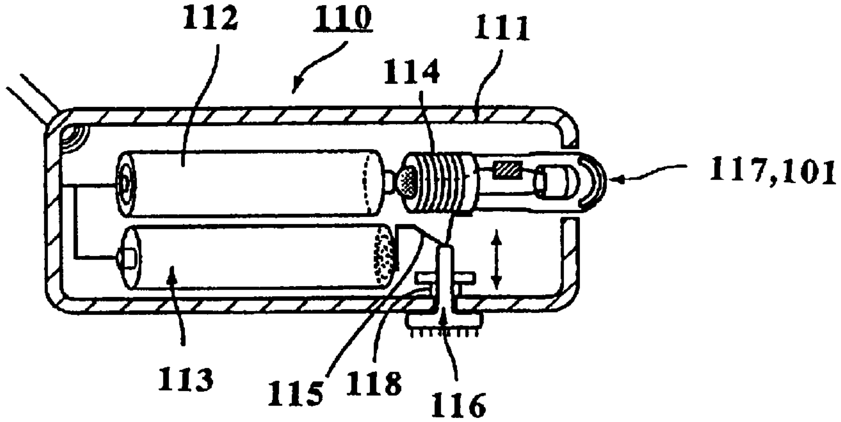
FIG. 7 is a schematic diagram showing an example of the marketed portable flashlight; and, FIG. 8 is an explanatory view showing the condition in which the portable flashlight of FIG. 7 is provided with the bulb of FIG. 6 according to the present invention and is used to judge whether the note is true or false.

FIG. 7 illustrates a typical constitution of the marketed portable flashlight. The illustrated portable flashlight 110 has, for example, a rectangular case 111 in which tow butteries 112 and 13, a socket 114, a sliding connection piece 115, and a press switch 116 for sliding the connection piece 115. A bulb 117 is screwed into the socket 114.

Pressing the switch 116 against spring force of a spring 118 makes to slide the sliding connection piece 115 connected to the end thereof, to thereby establish a power supply circuit from the butteries 112 and 113 to the bulb 117, which is energized. When the switch 116 is released, the sliding contact piece 115 is made apart from the socket 114 by the spring force to cut off the power supply circuit and the bulb is turned off.

Here, the false note detecting bulb 101 shown in FIG. 6 is able to screw into the socket 114 substituting for the bulb 117 of the portable flashlight 110 and is also possible to enlighten with the same level of electric power. Thus, by attaching the false note detecting bulb 101 to the socket 114, the portable flashlight 110 is converted into a portable false note detecting device.

Figure 8:
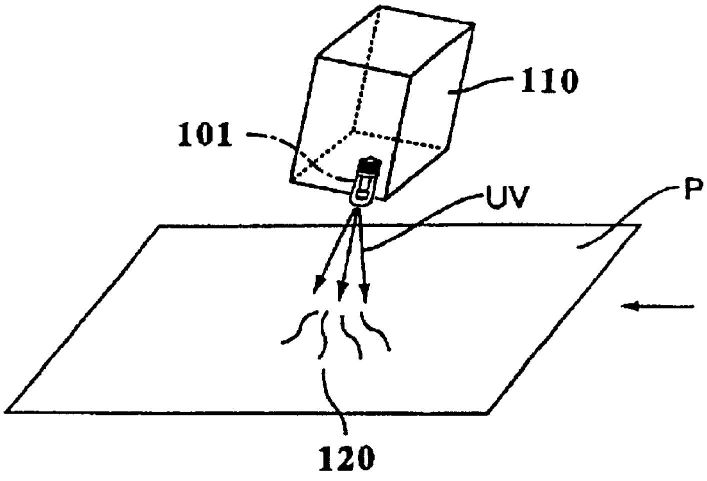

Namely, the switch 116 is pressed to irradiate the ultraviolet light UV, which is irradiated on the note P to be inspected as shown in FIG. 8, whereby the design (the ultraviolet irradiation pattern) 120 formed on the surface of the note comes out and becomes visible. In case these designs will not come out, you will know the concerned note P is a false note.

Explained as above, using the false note detecting bulb of the present invention, it is possible to use the marketed portable flashlight as the portable false note detecting device as it is. Accordingly, it is possible to judge the truth or false of notes or tickets wherever and whenever you want. So it is extremely convenient.

It is note that the word "false note" is intended to use in this specification to include not only the false note but also false papers with printed or formed design (an ultraviolet irradiation pattern) which is come out to be visible by irradiating the ultraviolet light on their surfaces.

What is claimed is:

1. A false note detecting sensor block comprising:

an LED array having a plurality of ultraviolet irradiating LEDs arranged in a row, a collimating lens for receiving an irradiated light from the LED array and for irradiating the light as a collimate light, an ultraviolet transmitting filter arranged between the LED and the collimating lens, a condenser lens for converging the ultraviolet reflected light that is reflected on the surface of the note to be inspected, and an inline image sensor for detecting the ultraviolet reflected light obtained via the condenser lens.

2. A false note detecting sensor block according to the claim 1, further comprising a signal processing circuit which, based on the output signal of the inline image sensor, determined an ultraviolet irradiating pattern printed on the surface of the note to be inspected with ultraviolet reaction ink to distinguish the note to be inspected whether it is true or false.

3. A false note detecting device comprising:

an LED array having a plurality of ultraviolet LEDs arranged in a row, a collimating lens for irradiating the light as a collimate one received from the LED array, an ultraviolet transmitting filter arranged between the LED array and the collimating lens, a condenser lens for converging an ultraviolet reflected light reflected on a surface of a note to be inspected, and an inline image sensor for detecting an ultraviolet reflected light received through the condenser lens, and a note transfer mechanism for transferring the note to be inspected along a transfer path through a detecting area by the false note detecting sensor block.

4. A false note detecting device according to claim 3, further comprising a signal processing circuit which, based on the output signal of the inline image sensor, determines an ultraviolet irradiating pattern printed on the surface of the note to be inspected with ultraviolet reaction ink to distinguish the note to be inspected whether it is true or false.

5. A false note detecting device according to claim 3, wherein the note transfer mechanism has a first and a second note paths a distribution mechanism for distributing a note after checked by the false note detecting sensor block to either of the first and second note paths based on the inspection result.

6. A false note detecting device comprising:

a false note detecting bulb housing an LED for irradiating an ultraviolet light;

an ultraviolet transmitting filter sealed in the false note detecting bulb and disposed in front of the LED;

a case in which the false note detecting bulb is arranged; and an ultraviolet irradiation opening formed in the case, wherein the false note detecting bulb comprises a tube having a sealed end and arranged passing through the ultraviolet irradiation opening, and a screwed type metal base attached on the other end of the tube.

* * * * *